US012768414B2

(12) United States Patent
Kiełczykowski et al.

(10) Patent No.: US 12,768,414 B2
(45) Date of Patent: Oct. 20, 2026

(54) HEAT SHIELD ASSEMBLY

(71) Applicant: GOODRICH CORPORATION, Charlotte, NC (US)

(72) Inventors: Piotr Kiełczykowski, Ruda Milicka (PL); Karol Straś, Jelenia Góra (PL); Marcin Szymon Sokołowski, Wojsławice-Kolonia (PL); Scottie G. Whittle, Springboro, OH (US); Kamil Mateusz Babicki, Chrząstawa Mała (PL); Bartłomiej Kamil Żuk, Legnica (PL); Andrzej Paweł Chwałek, Miękinia (PL); Nicholas Edward Scaggs, Yellow Springs, OH (US)

(73) Assignee: GOODRICH CORPORATION, Charlotte, NC (US)

(*) Notice: Subject to any disclaimer, the term of this patent is extended or adjusted under 35 U.S.C. 154(b) by 358 days.

(21) Appl. No.: 18/411,386

(22) Filed: Jan. 12, 2024

(65) Prior Publication Data

US 2024/0240684 A1 Jul. 18, 2024

(30) Foreign Application Priority Data

Jan. 18, 2023 (EP) .................................... 23461503

(51) Int. Cl.
*F16D 65/78* (2006.01)
*F16D 55/36* (2006.01)
(Continued)

(52) U.S. Cl.
CPC ........... *F16D 65/847* (2013.01); *F16D 55/36* (2013.01); *F16D 2055/0037* (2013.01); *F16D 2065/785* (2013.01)

(58) Field of Classification Search
CPC ............... F16D 65/78; F16D 2065/781; F16D 2065/784; F16D 2065/785;
(Continued)

(56) References Cited

U.S. PATENT DOCUMENTS

| | | | |
|---|---|---|---|
| 3,958,833 | A | 5/1976 | Stanton |
| 4,083,434 | A | 4/1978 | Pinter |

(Continued)

FOREIGN PATENT DOCUMENTS

| | | |
|---|---|---|
| EP | 3753793 | 12/2020 |
| WO | 2005106279 | 11/2005 |

OTHER PUBLICATIONS

European Patent Office; European Search Report dated May 19, 2023 in Application No. 23461503.7.

*Primary Examiner* — Stacey A Fluhart
(74) *Attorney, Agent, or Firm* — SNELL & WILMER L.L.P.

(57) ABSTRACT

A heat shield assembly comprising a plurality of heat shield components each comprising a substantially C-shaped structure of heat shield material defining a substantially rectangular body having a top and two opposing elongate side walls extending from respective opposite sides of the top to a bottom edge, the top and the side walls defining a substantially rectangular inner cavity to receive, in use, a rotor lug on the periphery of a rotor disk of a brake stack, each heat shield component further comprising flanges extending outwards from the bottom of the side walls at both sides and both ends of the heat shield component, and wherein the flanges are configured to allow overlap with a flange of an adjacent heat shield component, in use.

13 Claims, 4 Drawing Sheets

(51) Int. Cl.
*F16D 65/847* (2006.01)
*F16D 55/00* (2006.01)

(58) Field of Classification Search
CPC ......... F16D 2065/786; F16D 2065/788; F16D 2065/789; F16D 65/807; F16D 65/827; F16D 65/847
See application file for complete search history.

(56) References Cited

U.S. PATENT DOCUMENTS

| | | | | | |
|---|---|---|---|---|---|
| 4,084,857 | A * | 4/1978 | VanderVeen | B60B 19/10 | 188/264 G |
| 4,784,246 | A * | 11/1988 | Edmisten | F16D 65/126 | 188/218 XL |
| 4,890,700 | A * | 1/1990 | Guichard | F16D 65/126 | 188/218 XL |
| 5,560,452 | A * | 10/1996 | Labougle | F16D 65/126 | 188/218 XL |
| 7,303,055 | B2 * | 12/2007 | Eckert | F16D 55/36 | 188/218 XL |
| 7,802,758 | B2 * | 9/2010 | Cress | F16D 65/126 | 188/73.2 |
| 11,274,716 | B2 | 3/2022 | Stras et al. | | |
| 2020/0400204 | A1 * | 12/2020 | Stras | B60C 23/19 | |

* cited by examiner

HEAT SHIELD ASSEMBLY

CROSS-REFERENCE TO RELATED APPLICATIONS

This application claims priority to, and the benefit of, EP Patent Application No. 23461503.7, filed Jan. 18, 2023, and titled "HEAT SHIELD ASSEMBLY," which is incorporated by reference herein in its entirety for all purposes.

FIELD

The present disclosure relates to a heat shield assembly for a wheel for a vehicle especially, but not exclusively, for an aircraft wheel.

BACKGROUND

Wheels on aircraft and other vehicles are often provided with a brake assembly comprising a stack of brake discs mounted inside the wheel, within the tube well of the wheel. The brake operates by compressing the brake discs together to slow and stop rotation of the wheel. The friction between the pressed brake discs generates a large amount of heat which can cause damage to the wheel and/or tires. It is conventional to provide a heat shield between the brake assembly and the wheel rim or tube well to reduce the effects of the heat generated by braking on the wheel parts. The heat shield can also catch hot brake material that is ejected from the brake discs during braking, before it strikes the wheel.

Various types of heat shield are known but, typically, heat shields are in the form of metal sheets or panels provided concentric with the wheel tube well and spaced a small distance from the tube well. Typically, the heat shield is formed from several layers of sheet metal including an inner layer and outer layers (wherein 'inner' means closer to the brake parts, and the radial direction is defined when the heat shield is mounted in the wheel, the wheel axis defining the axial direction). The heat shield can be provided as a single cylindrical unit (of such inner and outer layers) but more typically is formed as a number of arcuate panels or segments of layers that are attached together via connectors at seams between the panels, to form a complete cylindrical heat shield.

Particularly with the increased use of carbon disc brakes, which have greater energy absorption capability than steel brakes and are significantly lighter, but which are larger than steel brake discs, it is important for the heat shields to be robust. There is, however, also a need for them to be as simple and lightweight as possible. In aircraft in particular, but also in other vehicles with braked wheels, there is a need to minimize the weight and size of the wheel assembly. Heat shields are therefore, often made of thin metal sheets but may be formed from two or more layers (as mentioned above) with an insulation gap therebetween.

Because of the high temperature and high stress/vibrational environments that braked wheels operate in and high centrifugal forces acting on the heat shields, as well as changes in tire pressure, the heat shield can be caused to deform and/or deflect. This can cause high stresses on the heat shield and can cause the heat shield to come into contact with the wheel tube well which can, in turn, result in wheel abrasion. Where the panels of the heat shield are formed of inner and outer layers of sheet metal, with a radially inner layer and one or more radially outer layers, in use, the inner layer will tend to become hotter than the radially outer layer(s) and will, therefore, undergo a different thermal expansion. The connectors that join the panels at the seams secure the layers forming the panel together at the seams—i.e. the inner and outer layers of each panel are essentially clamped or secured together at the edges of the panel which means that the inner and outer layers of a panel are not able to move relative to each other. Because of this, the difference in thermal expansion between the inner and outer layers leads to the heat shield panel deforming or buckling. The deformed surface, which bows outwards, may abut against the wheel and therefor suffer or cause damage or degradation.

There is a need for an improved heat shield assembly which is robust and resistant to high temperatures and is relatively simple and lightweight.

SUMMARY

According to the present disclosure, there is provided a heat shield assembly comprising a plurality of heat shield components each comprising a substantially C-shaped structure of heat shield material defining a substantially rectangular body having a top and two opposing elongate side walls extending from respective opposite sides of the top to a bottom edge, the top and the side walls defining a substantially rectangular inner cavity to receive, in use, a rotor lug on the periphery of a rotor disk of a brake stack, each heat shield component further comprising flanges extending outwards from the bottom of the side walls at both sides and both ends of the heat shield component, and wherein the flanges are configured to allow overlap with a flange of an adjacent heat shield component, in use.

Each heat shield component may be formed of two substantially C-shaped segments that combine to form the substantially rectangular body. The two segments may overlap.

In an embodiment, a flange at one end of each heat shield component is raised relative to a flange at an opposite end and/or a flange at one long side of each heat shield component is raised relative to a flange at an opposite long side.

In an embodiment, the ends of the substantially rectangular body are open.

One or more holes may be provided in the side walls to receive one or more fasteners.

According to another aspect, there is provided a rotor disk of a brake stack having a plurality of elongate lugs formed around its outer periphery and having a heat shield assembly as defined above, provided on the rotor disk, wherein one of the plurality of heat shield components is fitted over each lug such that the end flanges of one heat shield component abut or overlap the end flanges of adjacent heat shield components and wherein the end flanges of one heat shield component can overlap or further overlap with the end flanges of adjacent heat shield components as the dimensions of the rotor disk change due to wear.

A clip may be provided over at least the ends of each rotor lug, and the heat shield components may be positioned over the clips. The ends of the heat shield components are open and the clips extend through the open ends. The clips and the heat shield components may be secured to the lug by fasteners.

Also provided is a brake stack having a plurality of rotor disks and a plurality of stator disks in alternating arrangement along an axis, each rotor disk having a plurality of elongate lugs formed around its outer periphery and having a heat shield assembly as defined above provided on the rotor disk, wherein one of the plurality of heat shield components is fitted over each lug such that the end flanges of one heat shield component abut or overlap the end flanges of adjacent heat shield components and wherein the end flanges of one heat shield component can overlap or further overlap with the end flanges of adjacent heat shield components as the dimensions of the rotor disk change due to wear, and such that the side flanges of the heat shield components on one rotor disk abut or overlap the side flanges of adjacent heat shield components on axially adjacent rotor disks, and wherein the side flanges of one heat shield component can overlap or further overlap with the side flanges of heat shield components on axially adjacent rotor disks as the dimensions of the rotor disks and/or the intermediate stator disks change due to wear.

A wheel assembly is also provided comprising a wheel rim having a radially inner surface and a radially outer surface, and a brake stack as defined above located within and radially spaced from the inner surface. The wheel assembly may have a plurality of torque bars arranged around the radially inner surface of the heat shield.

BRIEF DESCRIPTION OF THE DRAWINGS

The assembly according to the disclosure will be described, by way of example only, with reference to the drawings. Variations and modifications are possible within the scope of the claims.

DETAILED DESCRIPTION

Figure 1:
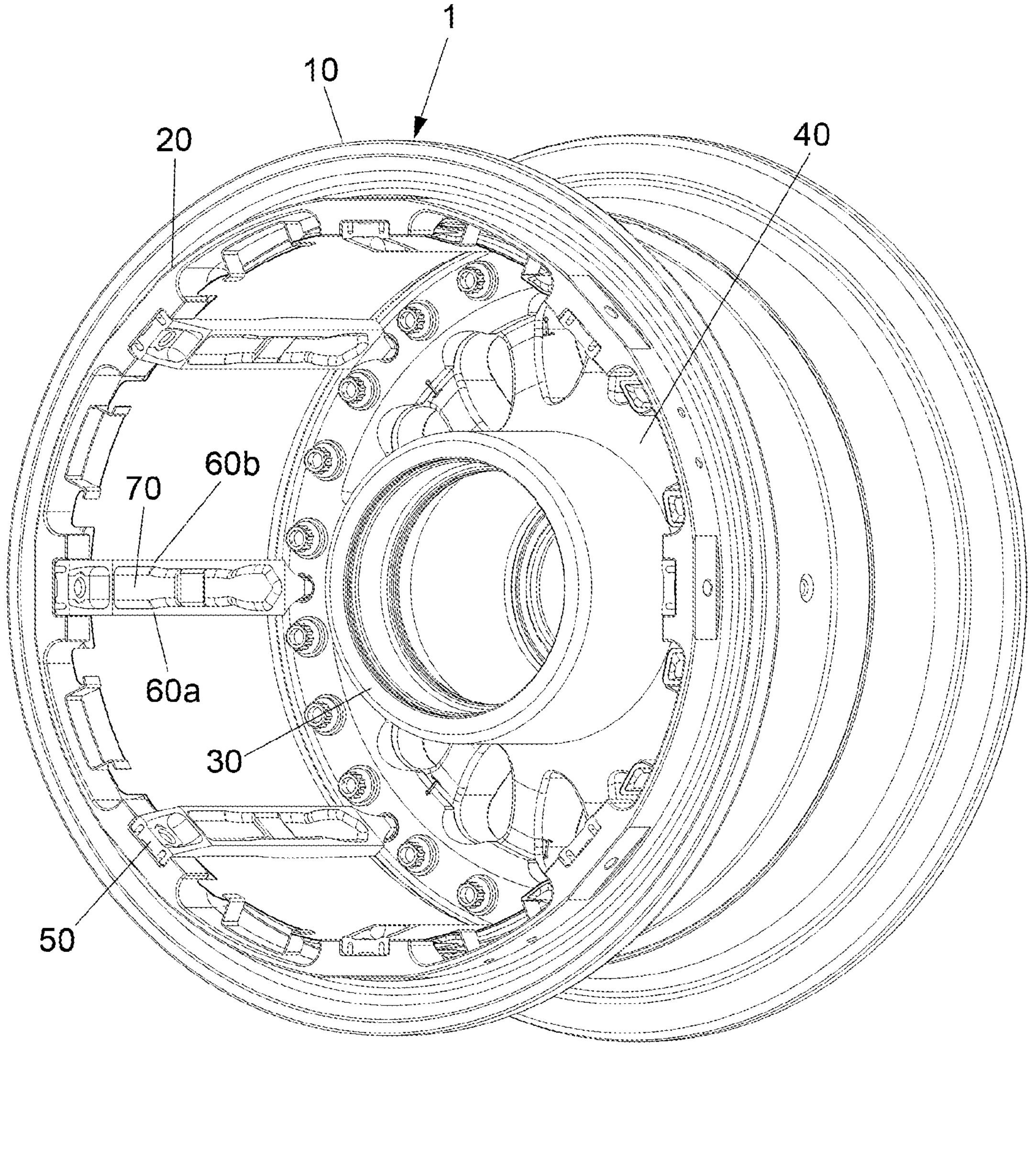
FIG. 1 shows an example of a conventional heat shield in a wheel.
Figure 2:
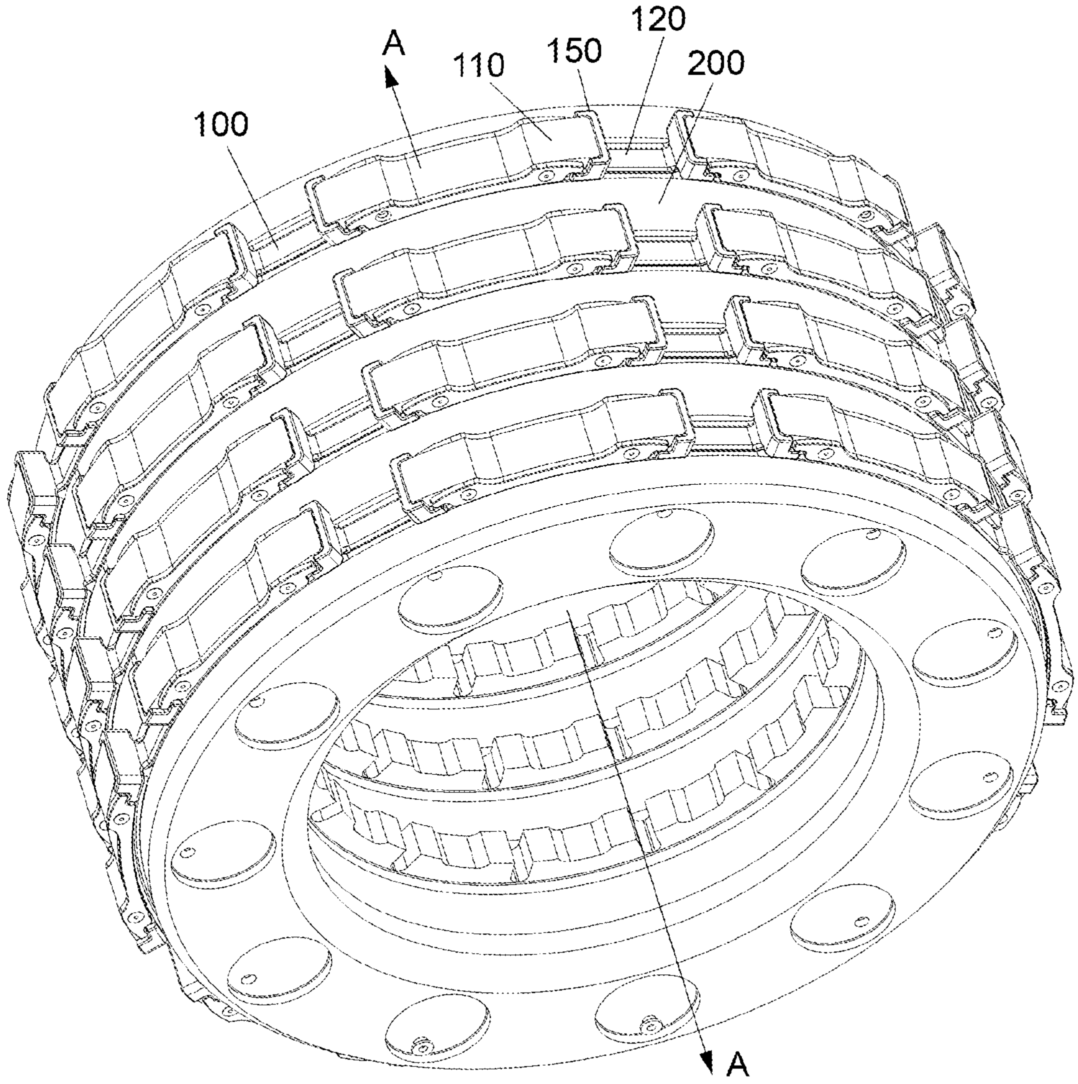
FIG. 2 shows conventional brake stack.

FIG. 1 shows a section of a typical wheel assembly comprising a wheel rim or tube well 1 having an outer diameter surface 10, on which a tire (not shown) will usually be mounted, and an inner diameter surface 20 defining an interior cavity in which a brake assembly (such as shown in FIG. 2) will typically be arranged around a wheel hub 30. The hub 30 would be attached by bearing to an axle (not shown). The hub 30 is connected to the wheel rim 1 via a web 40. Rotor disc torque bars 50 extend axially across the tube well 1 for engagement with the brake discs.

A typical brake assembly is shown in FIG. 2 and comprises a stack of alternating rotor disks 100 and stator disks 200 arranged along an axis A and rotationally coupled to the wheel. FIG. 2 shows four rotor disks and five stator disks but any suitable number of disks may be provided. The brake rotor disks 100 are rotationally coupled to the wheel rim 1 via the torque bars 50 such that the rotor disks rotate with the wheel but can move axially relative thereto. The brake rotor disks are provided with rotor lugs 110 spaced around the outer periphery of the disk with gaps or slots 20 defined between adjacent lugs 110 to engage with the torque bars 50 of the wheel. Because brakes are typically made of a relatively soft material such as carbon to make the brake assembly as light as possible, the brake disk material including that of the lugs is liable to wear. Typically, therefore, clips 150 are provided to reinforce the ends of the rotor lugs and the material in the gaps 120. These clips are mounted onto the lugs and/or into the gaps and are usually fixed to the lugs by e.g. rivets or other fasteners or are otherwise secured in the slots and over the ends of the lugs. The stator disks 200 are arranged between each adjacent pair of rotor disks and at either end of the brake stack. The stator disks are coupled to the wheel axle so that they do not rotate relative to the axle or to the rotor disks but can move axially relative thereto. To brake the wheel, pressure is applied to an end of the brake stack to push the disks together into frictional engagement which prevents the rotor disks from rotating relative to the axle and stator disks and thereby prevents rotation of the wheel. The friction generates heat.

To protect the wheel rim 1 from the heat generated during hard braking or from brake disc material ejected during braking, a heat shield is typically mounted to the inner diameter surface 20 of the wheel. The heat shield may be a single tubular shield or, as shown in the example of FIG. 1, may be formed of several heat shield panels 60 provided between the rotor drive lugs 50. The heat shield/panels 60 is in the form of several thin metal sheets or layers sandwiched together, including an inner layer and an outer layer, and possible one or more intermediate layers, and with insulation gaps therebetween and is attached to the wheel so as to be spaced apart from the wheel inner diameter surface 20 by a small insulation gap (not shown). Here, the term ‘inner layer’ is used for the layer of the heat shield panel closest to the tube well and ‘outer layer’ is the layer of the heat shield panel furthest from the tube well. Where the heat shield is made of a number of panels or segments attached together, the adjoining edges 60*a*, 60*b* of the panels are connected by means of connectors 70. The connectors 70 each define a seam between adjacent panels.

As mentioned above, in the harsh braking conditions experienced by e.g. wheels on an aircraft landing gear, high temperatures are reached and pieces of hot material can break off from the rotor discs. Thus, in use, the wheel assembly becomes hot and the purpose of the heat shield is to manage the heat generated in the wheel assembly. Accordingly, the heat shield materials also experience high temperatures. The temperature at the inner surface of the heat shield is higher than that at the outer surface which means that the inner layer of the panels will become hotter than the outer layer. Consequently, the inner layer will undergo greater thermal expansion than the outer layer. This can cause the heat shield to be damaged and/or to contact the wall of the tube well 1 by being deflected into the insulation gap between the heat shield and the tube well interior surface. Because the retainer is made of relatively thin, light material, deformation of the panels can cause the retainer to deflect outwards and contact the wheel rim and this can result in damage and wheel abrasion. Also, if the retainers are not sufficiently strong to retain the heat shield panels in such conditions, the heat shield panels themselves can also contact the wheel. This can cause wheel abrasion and/or heat shield damage/abrasion and require the entire wheel assembly to be replaced.

The aim of the present disclosure is to provide a simple, lightweight heat shield assembly that avoids some of these problems but still provides the wheel with protection against heat generated by the brake assembly. This is achieved by providing heat shields on the rotor lugs of the rotor disks of the brake assembly as described further below, rather than attached to the wheel or in the space between the wheel and the brake stack. The heat shield assembly according to the disclosure rotates with the rotors and removes the risk of contact with the wheel whilst still having good thermal properties and being small, simple and lightweight.

Figure 3:
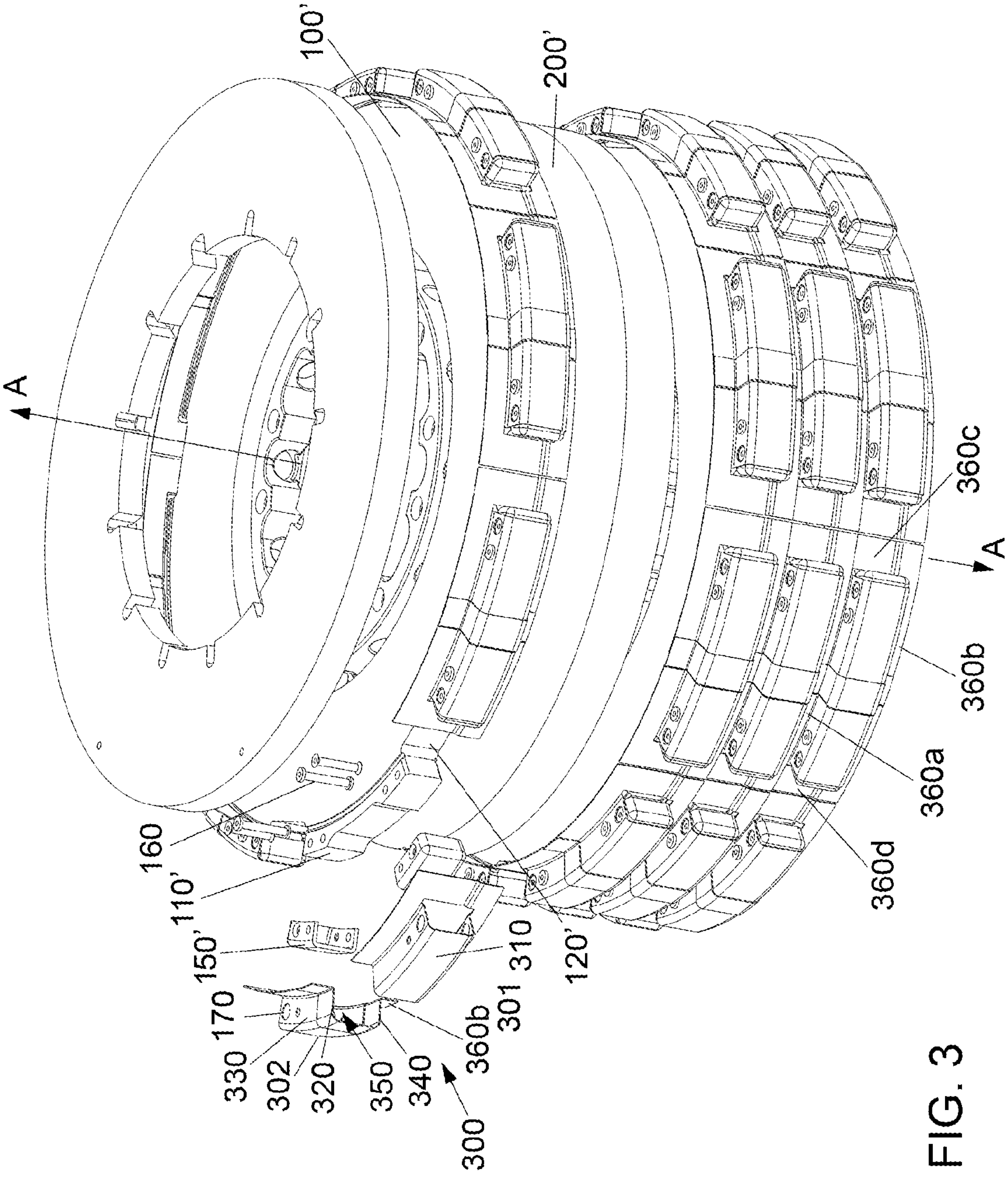
FIG. 3 shows a partially exploded view of a wheel brake assembly having a heat shield assembly according to this disclosure.
Figure 4:
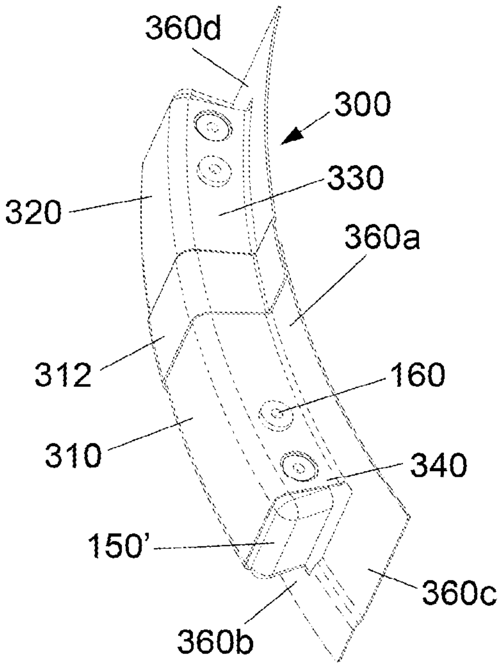
FIG. 4 is a perspective view of a heat shield according to this disclosure.

Referring to FIGS. 3 and 4, the heat shield assembly according to the disclosure comprises a heat shield component 300 having a substantially C-shaped body of heat shield material defining a hollow substantially rectangular form having a top 310 and opposing side walls 320, 330 extending from the top to bottom side wall edges 340, the top and the side walls defining an interior cavity 350 shaped and sized to fit over a rotor disk lug 110', the heat shield component further having flanges 360*a*, 360*b*, 360*c*, 360*d* extending outwardly from the bottom side wall edges in the axial and radial directions—i.e. extending out from the bottom of the rectangle on all sides.

In one example, the heat shield component comprises two segments 301, 302 that combine to form the rectangular form and wherein the two segments overlap in a region 312 where they join. This simplifies assembly of the heat shield component onto the rotor lug as one segment can bit fitted over each end of the lug. The heat shield component could, however, be provided by a single-piece component of flexible material that can be stretched or otherwise fitted over the lug.

The heat shield component 300 is secured to the lug by e.g. rivets 160 or other fasteners. Where the rotor lug is provided with clips 150', the heat shield component is fitted over the clips. The heat shield component and the clips could be secured to the lug by the same rivets/fasteners 160 or by different fasteners. The heat shield component may be open at each end between the side walls, allowing the caps 150' which are located over the ends of the lugs between the lug and the heat shield component, to extend from the open ends to provide the additional reinforcement to the lugs as mentioned above. In other words, the heat shield components wrap around the non-loaded surfaces of the lugs and clips leaving the loaded surfaces of the clips free.

Figure 5A:
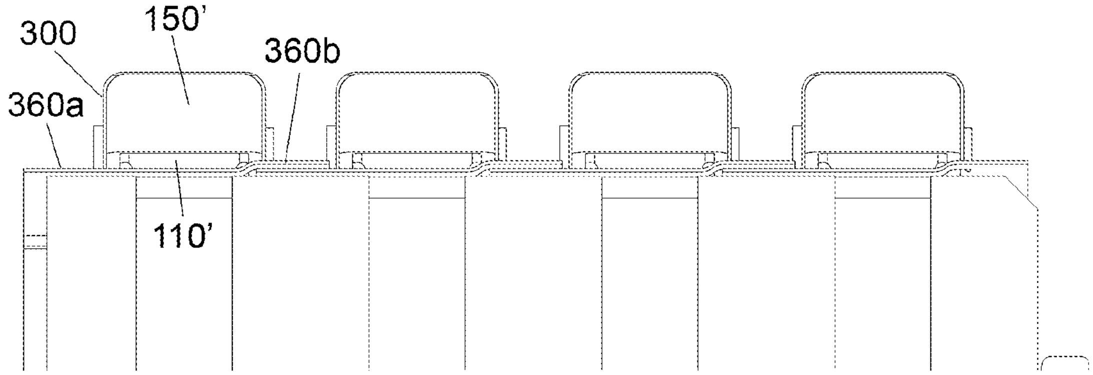
FIG. 5A is a side sectional view of a brake assembly with a heat shield assembly according to this disclosure when the brake disks are not worn.

A heat shield component 300 is provided over each lug 110' 100' of a rotor disk and the flanges 360*a-d* are sized such that, in the circumferential direction, the flange 360*c*, 360*d* of a heat shield component on one lug extends to abut or slightly overlap the flange of a heat shield component 360*c*, 360*d* on the adjacent lug when the disk and lugs are in the unworn state. Thus, the flanges cover the lug surfaces, the slots or gaps 120' between the lugs and the spaces between the rotor disks 100' and stator disks 200' in the axial direction A. The flanges are formed such that as the disks/lugs become worn in the circumferential dimension, the flange of one heat shield component will overlap/further overlap that of the adjacent component. The flanges 360*a*, 360*b* in the axial direction also extend such that flanges of heat shield components on lugs of axially adjacent rotor disks abut or slightly overlap each other in the axial direction and thus also cover the periphery of the intermediate stator disk. Again, the flanges are configured such that as the disks wear and become thinner (axially), the flanges will overlap/further overlap to avoid buckling, deformation or damage to the heat shield and to maintain full coverage of the brake stack as the brake components wear. This can best be seen by comparing FIGS. 5A and 5B. In FIG. 5A, the disks are hardly worn or not worn at all so the flanges (360*a*, 360*b*) abut and thus provide full coverage of the brake stack with heat shield material. As the disks become worn (FIG. 5B), the flanges (360*a*, 360*b*) overlap.

Figure 5B:
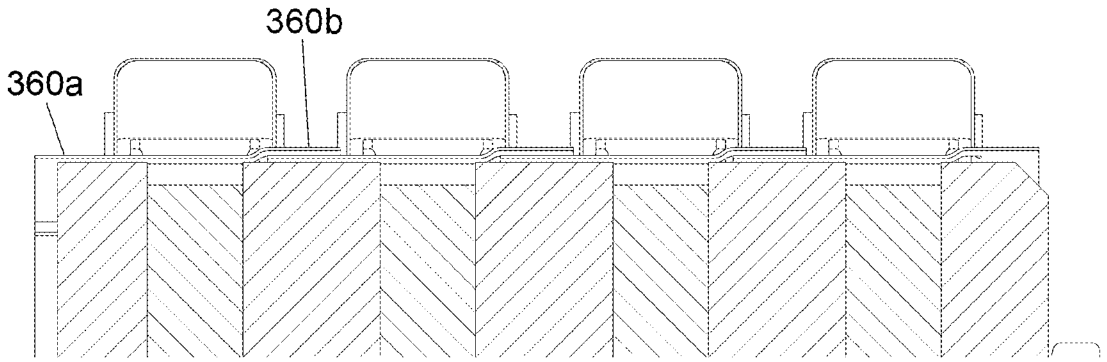
FIG. 5B is a side sectional view of a brake assembly with a heat shield assembly according to this disclosure when the brake disks are worn.

To allow for the overlap, the flanges may be formed as shown in e.g. FIGS. 5A and 5B wherein the flange 360*b* on one side of the component is raised relative to the flange 360*a* on the other side and adjacent heat shield components are assembled such that the lower flange of one component is adjacent the raised flange of the next component. During wear, the lower flange of the one component can then move underneath the raised flange of the adjacent component as seen in FIG. 5B. Other ways of allowing the flanges to overlap may also be possible within the scope of the invention. For example, the flanges may be formed of a flexible material that lifts as an adjacent flange moves underneath it. Various types of heat shield material are known and any available heat shield material could be used for the heat shield components of this disclosure.

The heat shield components shown in the examples have a single layer of heat shield material. They could, however, be formed of multiple layers to provide a greater heat barrier.

As the heat shield components are configured to provide full coverage across the brake stack, they will also act to catch any brake dust that is generated, in addition to providing the wheel with protection against the heat generated by the brake stack. By providing the heat shields on the rotor lugs in this way, and providing for overlap as the brake components wear, the risk of the heat shield contacting the wheel due to thermal expansion, and, thus, the risk of abrasion is considerably reduced. The arrangement of this disclosure also protects the torque bars from direct radiation heat from the brake stack.

What is claimed is:

1. A heat shield assembly comprising a plurality of heat shield components each comprising a substantially C-shaped structure of heat shield material defining a substantially rectangular body having a top and two opposing elongate side walls extending from respective opposite sides of the top to a bottom edge, the top and the side walls defining a substantially rectangular inner cavity to receive, in use, a rotor lug on the periphery of a rotor disk of a brake stack, each heat shield component further comprising flanges extending outwards from the bottom of the side walls at both axial sides and both circumferential ends of the heat shield component, wherein the flanges are configured to allow overlap with a flange of an adjacent heat shield component, in use, wherein each heat shield component is formed of two substantially C-shaped segments that combine to form the substantially rectangular body, and wherein the two segments overlap.

2. The heat shield assembly as claimed in claim 1, wherein a flange at one circumferential end of each heat shield component is raised relative to a flange at an opposite circumferential end.

3. The heat shield assembly as claimed in claim 1, wherein a flange at one long side of each heat shield component is raised relative to a flange at an opposite long side.

4. The heat shield assembly as claimed in claim 1, wherein the ends of the substantially rectangular body are open.

5. The heat shield assembly as claimed in claim 1, further comprising one or more holes in the side walls to receive one or more fasteners.

6. A rotor disk of a brake stack having a plurality of elongate lugs formed around its outer periphery and having the heat shield assembly as claimed in claim 1 provided on the rotor disk, wherein one of the plurality of heat shield components is fitted over each lug such that circumferential end flanges of one heat shield component abut or overlap the circumferential end flanges of adjacent heat shield components and wherein the circumferential end flanges of one heat shield component adjusts to overlap or further overlap with the circumferential end flanges of adjacent heat shield components as the dimensions of the rotor disk change due to wear.

7. The rotor disk as claimed in claim 6, further comprising a clip provided over at least the ends of each rotor lug.

8. The rotor disk as claimed in claim 7, wherein the heat shield components are positioned over the clips.

9. The rotor disk as claimed in claim 8, wherein the ends of the heat shield components are open, and the clips extend through the open ends.

10. The rotor disk as claimed in claim 7, wherein the clips and the heat shield components are secured to the lug by fasteners.

11. A brake stack having a plurality of rotor disks and a plurality of stator disks in alternating arrangement along an axis (A), each rotor disk having a plurality of elongate lugs formed around its outer periphery and having the heat shield assembly as claimed in claim 1 provided on the rotor disk, wherein one of the plurality of heat shield components is fitted over each lug such that circumferential end flanges of one heat shield component abut or overlap the circumferential end flanges of adjacent heat shield components and wherein the circumferential end flanges of one heat shield component adjusts to overlap or further overlap with the circumferential end flanges of adjacent heat shield components as the dimensions of the rotor disk change due to wear, and such that axial side flanges of the heat shield components on one rotor disk abut or overlap the axial side flanges of adjacent heat shield components on axially adjacent rotor disks, and wherein the axial side flanges of one heat shield component adjusts to overlap or further overlap with the axial side flanges of heat shield components on axially adjacent rotor disks as the dimensions of the rotor disks and/or the intermediate stator disks change due to wear.

12. A wheel assembly comprising a wheel rim having a radially inner surface and a radially outer surface, and the brake stack as claimed in claim 11 located within and radially spaced from the inner surface.

13. The wheel assembly of claim 12, further comprising a plurality of torque bars arranged around the radially inner surface of the heat shield assembly.

* * * * *